Dec. 7, 1965　　　M. L. GRANBERG　　　3,222,595
TRANSITION TIME DELAY TESTING DEVICE
Filed June 30, 1961　　　　　2 Sheets-Sheet 1
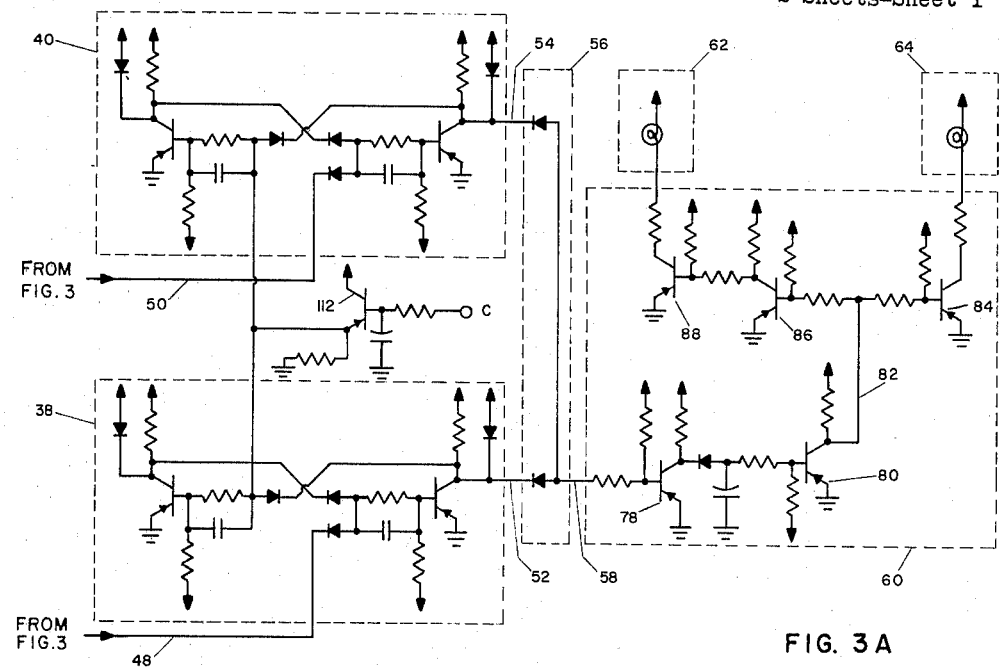
FIG. 3A
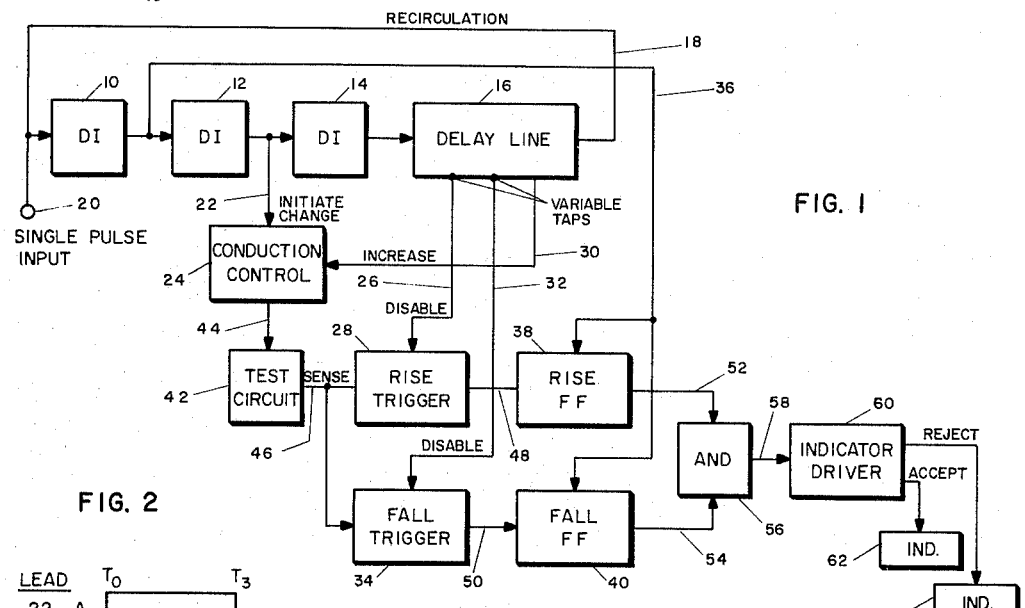
FIG. 1
FIG. 2
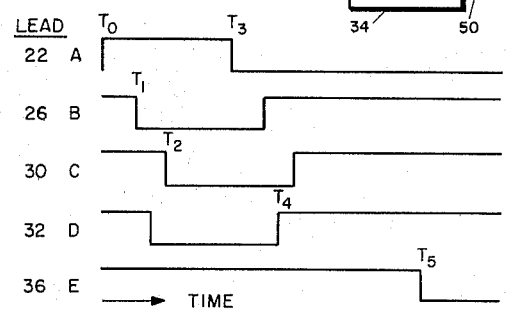
INVENTOR
MAURITZ LELAND GRANBERG
BY
AGENT INVENTOR
MAURITZ LELAND GRANBERG
BY
Marvin Jacobson
AGENT 3,222,595
TRANSITION TIME DELAY TESTING DEVICE
Mauritz Lelad Granberg, Richfield, Minn., assignor to Sperry Rand Corporation, New York, N.Y., a corporation of Delaware
Filed June 30, 1961, Ser. No. 121,088
17 Claims. (Cl. 324—57)

This invention relates to testing devices for checking the delay in operation of electronic devices and more particularly for checking the transition time of an electronic device in changing states of conduction.

Although the following discussion will be limited to describing an embodiment of this invention as utilized for testing transistors for inherent transition times when switched between different levels of conduction, it will be apparent that this invention can be utilized for testing a variety of electronic devices for delay times in changing from a level of conduction to other levels of conduction.

With the aim in design of many present day electronic machines being towards faster speed of operation it becomes important to determine whether the component parts of the machine are capable of performing at the required high speeds. Transistors which are used in great quantity in many electronic machines are known to have inherent characteristics which result in a certain amount of transition time when the transistor is driven between various levels of conduction. For example, a transistor is to be used as a switching device and must respond to a control pulse signal of one microsecond duration. It is important that the transition time or delay time of the transistor in turning on and off must not be any substantial portion of this one microsecond control signal. As the control signals are increased in frequency and decreased in time period in order to increase the speed of operation, the response time of the transistor must therefore be increased. In designing machines of a given speed of operation it is necessary to place a specification on the transition time of the transistors to be utilized to prescribe limits to said delay or transition times. For on-off switching purposes these specifications limit the rise time of the transistor, the length of time it takes for the transistor to go from an off or nonconducting state to a prescribed conduction level, and the fall time, the amount of time it takes the transistor to fully turn off in response to a signal which initiates turn off. Of course, rise time may also be considered to include the time to go from a low conduction level to a higher conduction level and fall time to include the length of time to go from a higher level to a lower level. Because of the rigid requirements of many of the specifications, for example those limiting rise and fall times to millimicroseconds, more commonly referred to as nanoseconds, to be assured of reliability of operation each of the transistors must be tested to determine if the delays in operation are within the limits as specified. Testing transistors for these transition times is a time consuming task and if done by visual means such as viewing a signal pattern on an oscilloscope, it is subject to human errors. The task is further increased if it is desired to test the transistor under different operating conditions. For example, it is known that a transistor will have a different rise time when initiated from the off condition or non-conducting state to a first level of conduction than it has from the off condition to a different level of conduction. Likewise in turning off a transistor it will have a fall time in response to a signal which initiates turn off, which differs depending on the level of conduction when said turn off initiating signal is applied. This invention provides means for testing a transistor or other electronic devices for various conditions of operation and for automatically developing signals to indicate whether said operation is within predetermined limits. The embodiment of this invention not only tests the electronic device for delays in operation to a high degree of accuracy but additionally makes it virtually immune to human errors. Furthermore, this testing apparatus is easily adjustable to test devices for various time delays and also for testing delay times between various levels of conduction.

In one embodiment of this invention, which will be described subsequently in more detail, a timing base is provided by a timing chain which develops a plurality of timing signals having predetermined time relationships with respect to one another. These timing signals are in the form of pulses with the leading and trailing edges of the pulses providing the time relationships. One of the timing signals from the timing chain is coupled to the device under test to initiate change to said device from a first conduction state to another level of conduction. A circuit monitors the operation of the device under test and senses when said device reaches said predetermined level of conduction in response to the initiating signal. When this other level of conduction is sensed, an output signal is developed by the sensing circuit to indicate the proper operation of the circuit under test. Another of the timing signals from the timing chain, which has a predetermined time relationship to the first signal, is coupled to the sensing circuit to prevent the development of the sensing circuit output signal if the other level of conduction is not reached by the time of the occurrence of the other timing signal. In addition to the foregoing still another timing pulse is coupled to the device under test to initiate a change in said test device back to the original conduction state. The sensing circuit senses when the device reaches said original conduction state in response to said latter initiating signal and develops another output signal at that time. A fourth timing signal, which occurs subsequent to said latter initiating signal, disables the sensing circuit and prevents it from generating said latter output signal if the test device has not yet reached the original conduction state. A typical example of the operation of the foregoing is in the testing of a transistor for transistion time between turn on and turn off. This is done by coupling a first timing signal to the control element of a transistor which is originally in the cutoff or nonconducting state so as to initiate turn on or conduction of the transistor and a second timing signal to initiate change from a conducting state back to the original nonconducting or cutoff state. The sensing circuit which is connected to another element of the transistor develops a first output signal when the transistor reaches conduction in response to the first timing signal and a second output signal when the transistor returns to nonconduction in response to the second timing signal. A third timing signal from the timing chain is coupled to the sensing circuit and occurs intermediate in time between the first and second timing signals to prevent the development of said first output signal if said first output signal has not been developed by the time of occurrence of the third timing signal. A fourth timing signal is also coupled to the sensing circuit, this fourth timing signal, occurring subsequent in time to the second timing signal, prevents the development of the second output signal if it has not been developed by the time of occurrence of the fourth timing signal. In this way both the turn on and turn off times, commonly referred to as rise and fall times respectively, of a given transistor are tested and corresponding signals are developed to indicate if the transistor operates within prescribed limits. In addition to the foregoing, a fifth timing pulse may be coupled to the device under test, this fifth timing pulse occurring at a time intermediate said third and second timing pulses, to drive the transistor further into conduction prior to testing the fall time of the transistor. In this manner the fall time of the transistor can be checked under a worst case of operation since the fall time is directly affected by the level of conduction of the transistor just prior to the initiation of the turn off. The output signals developed by the sensing circuit can be used individually to indicate if the transistor operates within preset limits of either the rise or fall times and can be utilized to indicate the amount of rise and fall times. Additionally, the tester includes a circuit for combining the output signals from the sense circuit in such a manner that if either of the output signals is not developed, which indicates that the transistor operates outside either the rise or fall time limits, an indication that the transistor is defective is achieved.

By incorporating a recirculating path in the timing chain so that the timing pulses repetitively occur in their same time relationships, the transistor or other electronic device under test can be repetitively tested under an increased duty cycle. This simulates another type of worse case condition of operation and provides a more complete test of the device. In one type of operation the results of the repetitive tests are subjected to an integrating effect in the form of a circuit which drives visual indicators. Because the latter circuit and the indicators are unable to respond at the same rapid rate as the tests are repetitively performed, an occasional error is not indicated so that devices which are tested and which fall within the limits of operation for a large percentage of the time will be indicated as acceptable devices. If it is desirable to obtain an indication that a device is defective if it fails even once during the repeated tests to meet the limits of operation, the tester includes further means for terminating the repetitive tests by terminating the recirculation in the timing chain thereby indicating the single failure.

These and other more detailed specific features will be disclosed in the course of the following specification, reference being had to the accompanying drawings, in which:

FIG. 1 is a block diagram of an embodiment of this invention;

FIG. 2 shows the timing relationship of the timing signals utilized in the embodiment of this invention;

FIG. 3A is a continuation of the FIG. 3 schematic.

Figure 3:
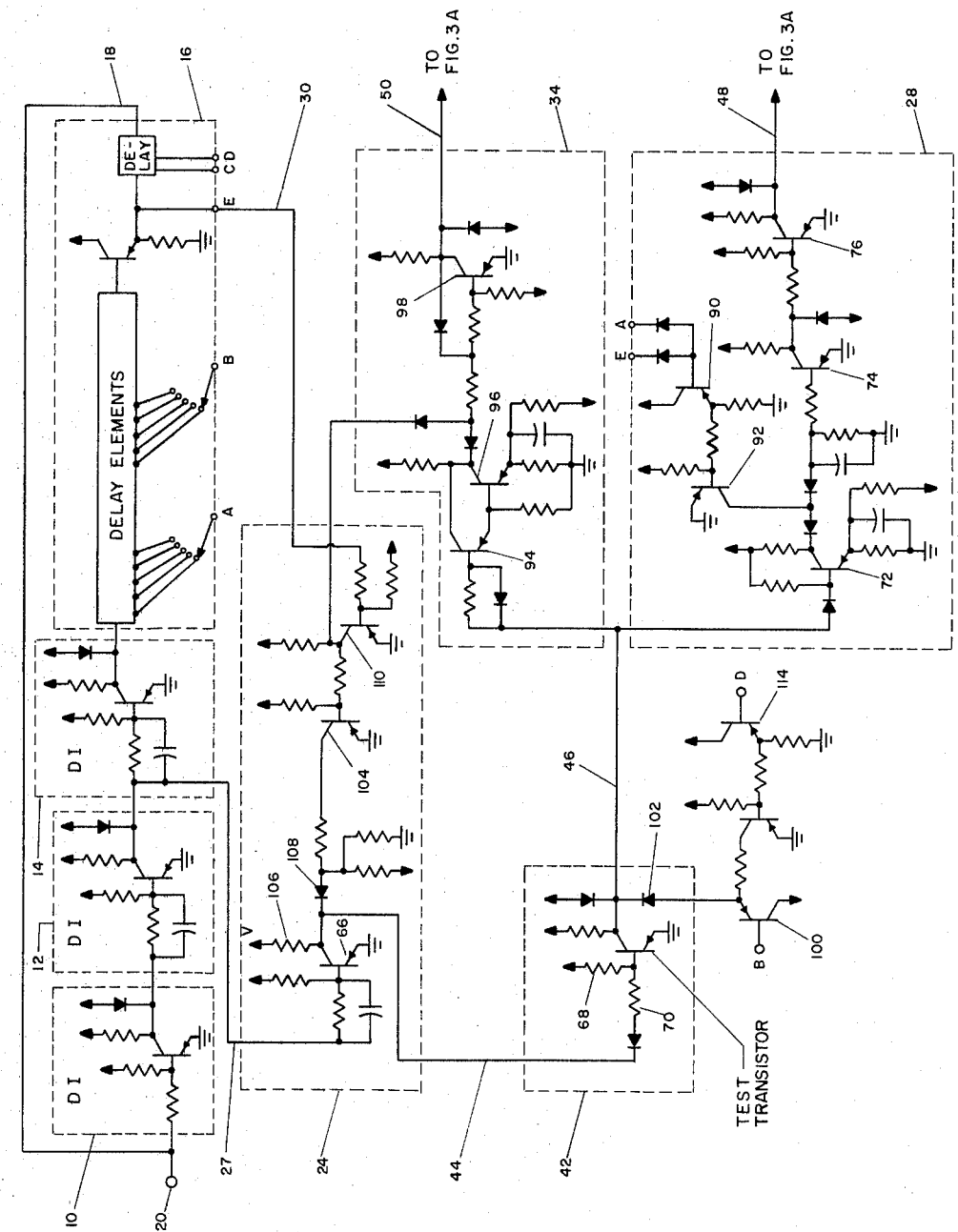
FIG. 3 is an electrical schematic of the block diagram embodiment of FIG. 1.

In the block diagram of one embodiment of this invention shown in FIG. 1, a timing chain including delay inverters 10, 12 and 14 and a delay line 16 provide the timing base for the operation of the tester. A pulse signal fed into the first delay inverter 10 in the timing chain is transmitted successively through delay inverters 12 and 14 and then through delay line 16. The timing chain further includes a recirculation path from the output of delay line 16 back to the input of delay inverter 10 via conductor 18 so that once a single pulse signal is fed into the timing chain it will recirculate and repetitively occur in the timing chain to provide repetitive timing signals. Reference to FIG. 2, which shows the timing relationships of the timing signals as they appear in the timing chain, will aid in understanding the operation of this embodiment of this invention. A single pulse input is fed into terminal 20 from a source not shown. An exemplary type of pulse which provides the timing signals required by propagation through the timing chain is shown in FIG. 2A. In FIG. 2 time increases in the direction from left to right thereby making the left-most edge of each of the pulses shown the leading edge thereof and the right-most edge of the pulses the trailing edge. The delay inverters in the timing chain provide time delays in the propagation of the pulse signal and in addition provide amplification, proper polarity, and shaping so as to insure accurate and precise timing signals. It should be understood that the pulses shown in FIG. 2 are only intended to show the relationships of the timing signals one to another as they occur in the timing chain and no limitation to this type of pulse is intended. The leading edge of a single pulse input at terminal 20, after the pulse is propagated through inverters 10 and 12 of the timing chain, appears at the output of inverter 12 on lead wire 22 at a time designated $T_0$ and provides an input to conduction control circuit 24. The pulse is also further delayed and inverted by inverter 14 and is transmitted into delay line 16. Lead wire 26 being connected to a variable tap on the delay line transmits this delayed and inverted pulse, as shown in FIG. 2B with leading edge occurring at $T_1$, to rise trigger circuit 28. The pulse shown in FIG. 2C with its leading edge occurring at time $T_2$ is transmitted to conduction control circuit 24 via the lead wire 30 which is connected to another variable tap on the delay line 16. At a time labeled $T_3$ the trailing edge of the pulse in FIG. 2A occurs. The next subsequent timing signal of importance in this embodiment is the trailing edge of the pulse shown in FIG. 2D, this pulse being a negative going pulse substantially identical to FIGS. 2B and 2C, and the trailing edge occurs at time $T_4$. This timing signal is transmitted from the variable tap on the delay line via lead wire 32 to the fall trigger circuit 34. The single pulse is propagated through the delay and recirculated back to the input of inverter 10 via lead wire 18 and the pulse shown in FIG. E with the leading edge occurring at time $T_5$ is transmitted from the output of inverter 10 via lead wire 36 to rise flip-flop 38 and fall flip-flop 40. The foregoing establishes the time relationships of the timing signals with respect to one another. Although it is understood that there are inherent time delays in the circuits which are controlled by the timing signals it should be understood that the operations controlled by the timing signals are performed in the same relative time relationships as the timing signals themselves occur. It should also be understood that the polarities of the pulses shown in FIG. 2 are not limitive since if the circuits to which they are transmitted require opposite polarity pulses a simple inversion can be performed while still maintaining the relative time relationships described.

While the following description of the operation of one embodiment of this invention will be limited to describing its use for testing a transistor for proper operation, it should be understood that this invention is not so limited. Additionally, although this description will describe a variety of tests under different conditions performed by the embodiment it should be understood that the scope of this invention includes the performance of only parts of the tests as well as additional tests which could be performed which would be obvious to those of ordinary skill in the art utilizing the teachings of this invention.

The transistor to be tested is contained in the test circuit 42. The conduction control circuit 24 is coupled to the control element, usually the base of the transistor, via lead wire 44 and controls the amount of base drive signal so as to initiate change in conduction level of the transistor via the test circuit. Lead wire 46 monitors the operation of the transistor under test by being coupled to one of the other elements in the transistor, usually the collector element. By monitoring the operation of the transistor a sensing signal indicative of the conduction level of the transistor is transmitted to rise trigger 28 and fall trigger 34 via lead wire 46. The rise and fall triggers are preset so that when the sense signal reaches a certain level indicative of a certain level of conduction of the transistor each of said triggers develops an output signal to indicate that the transistor has reached the predetermined level of conduction. The timing signals on lead wires 26 and 32 are also fed into the rise trigger and fall trigger respectively and if the corresponding trigger has not developed an output signal by the time of occurrence of the corresponding timing signals on lead wires 26 and 32, the triggers are disabled and are thereby prevented from developing an output signal. The output signal from the rise and fall triggers appearing on lead wires 48 and 50 respectively are transmitted into the respective bistable flip-flops, that is rise flip-flop 38 and fall flip-flop 40. The timing signal on lead wire 36 from the timing chain switches the flip-flops to the reset state. The outputs of the rise and fall flip-flops are fed into AND circuit 56 via lead wires 52 and 54 respectively. Upon occurrence of the proper signal on both of the latter lead wires a signal output on lead wire 58 is transmitted to indicator driver 60 and this in turn causes visual indicator 62 to turn on thereby indicating that the transistor is acceptable. Unless both of the flip-flop signals are proper the indicator driver maintains visual indicator 62 in a conduction state thereby indicating that the transistor does not fall within the rise and fall time limits.

To more fully describe in detail the operation of the block diagram of FIG. 1, reference should be made to FIG. 2. For ease of explanation rather than refer to each of the pulses of FIG. 2 as pulses and the leading and trailing edges thereof, hereinafter the timing signals will be referred to as they are labeled in FIG. 2 by T with proper subscript which indicates the relative time relationship of each of the timing signals with respect to one another. For example the leading edge of the pulse of FIG. 2A is timing signal $T_0$ while the trailing edge of that pulse is timing signal $T_3$. Each of the remaining timing signals which are required to describe the operation of the circuit of FIG. 1, $T_1$, $T_2$, $T_4$ and $T_5$, are labeled according to their relative occurrence timewise in relationship to each other and to $T_0$ and $T_3$.

A single positive polarity pulse, substantially identical to that shown in FIG. 2A, is applied to terminal 20 from a source not shown. This pulse will be propagated through the timing chain as previously described and will appear at various points in the timing chain at different times as determined by the amount of delay in the inverters and in the delay line 16. The present description will be limited to a single pass of the pulse through the timing chain and it will be obvious that the recirculation of the pulse through the timing chain will result in repetitive testing operations. After double inversion through delay inverters 10 and 12 the single pulse appears on lead wire 22 to provide timing signal $T_0$ as an input to the conduction control circuit 24. Assuming the transistor to be tested, which is in test circuit 42, is originally in the cutoff or nonconducting state, timing signal $T_0$ causes the conduction control circuit 24 to change the base drive circuit of the transistor so as to initiate conduction of the transistor from the cutoff state to a first level of conduction. The operation of the transistor is monitored in the collector circuit and a sensing signal indicative of the amount of conduction occurs on lead wire 46. Because of inherent characteristics of the transistor there is a delay in the rise of the conduction level of the transistor from the cutoff state in response to initiation of the conduction by timing signal $T_0$. The rise trigger 28 is preset so that when the signal on lead wire 46 reaches a certain level an output signal from the rise trigger will be developed and appears on lead wire 48. However, if timing signal $T_1$ in FIG. 2B occurs before this output signal is developed the rise trigger is disabled and thereby prevented from developing an output signal. The lack of an output signal from the rise trigger indicates that the transistor has failed to reach the predetermined level of conduction in response to timing signal $T_0$ in the time interval between $T_0$ and $T_1$. In testing the transistor if the only important criteria is the rise time it is obvious that this test alone may be performed utilizing the teachings of this invention. Additionally, it is obvious that the limits for the rise time test may be varied by moving the variable tap on the delay line to which lead wire 26 is connected. As will be described subsequently in more detail in describing the circuitry utilized in the embodiment of this invention, rise trigger 28 may be adjusted to test for rise times between cutoff and different levels of conduction or between one level of conduction and higher levels.

Timing signal $T_2$ as shown in FIG. 2C, which occurs timewise intermediate $T_1$ and $T_3$, is transmitted from the delay line in the timing chain to the conduction control circuit 24 via lead wire 30. This causes the conduction control circuit to further vary the base drive of the transistor so that it is driven into a higher level of conduction. This provides a means for testing the transistor under a worst case type of operation as previously described, that is where the transistor is caused to conduct heavily just prior to switching it back to the cutoff state. Timing signal $T_3$ shown in FIG. 2A applied to the conduction control circuit via lead wire 22 causes the conduction control circuit to again vary the base drive of the transistor so as to initiate return of the transistor to the cutoff state. The sensing signal on lead wire 46 which results from the monitoring of the collector circuit of the transistor is transmitted into the fall trigger 34. When this sensing signal reaches a certain level, as preset in the fall trigger, the fall trigger develops an output signal on lead wire 50 which indicates that the transistor has reached the cutoff or nonconducting state in response to the timing signal $T_3$. If the transistor has not fully been cut off by the time occurrence of timing signal $T_4$, this latter timing signal applied to the fall trigger via lead wire 32 from the timing chain delay line disables the fall trigger and prevents it from developing an output signal. In this way an output signal on lead wire 50 indicates that the transistor fall time is within prescribed limit, that is that the inherent delay in the transistor is not so great that the transistor was unable to return the cutoff state in response to timing signal $T_3$ in the time interval between $T_3$ and $T_4$. Conversely, of course, the lack of a signal on lead wire 50 indicates that the fall time of the transistor exceeds the limit. The same variations that are described above in relation to the rise trigger in checking for rise time are also available in regard to checking the fall time of the transistor and if the fall time is the only criteria for determining the acceptability of the transistor, obviously only the portion of the circuitry in FIG. 1 relating to the fall time test need be utilized. Additionally, the increased conduction resulting form $T_2$ may be eliminated as desired.

The circuit of FIG. 1 includes means for testing the transistor and for indicating its acceptability when both rise and fall times are important criteria. Assuming the bistable flip-flops, rise flip-flop 38 and fall flip-flop 40 are in an initial state referred to as the reset state, an output signal from the rise trigger upon lead wire 48 switches the rise flip-flop to its other state to cause it to produce a signal on lead wire 52. An output signal from the fall trigger on lead wire 50 transmitted to the fall flip-flop causes it to switch to its other state and produce a signal on lead wire 54. Since the flip-flops are bistable devices, once the rise flip-flop is set to its other state, the signal will remain on lead wire 52 into AND circuit 56 during the fall check so that if a signal is produced on lead wire 54 into the AND circuit from the fall flip-flop, the AND circuit will be satisfied and a signal will therefore be transmitted into the indicator driver 60 via lead wire 58. Normally the indicator driver maintains the reject indicator 64 in the conducting state to visually indicate that the transistor is unacceptable. However, if the conditions of the input to the AND circuit are satisfied so that a signal is fed into the indicator driver it will cause the reject indicator 64 to turn off and the accept indicator 62 to turn on thereby indicating that the transistor is acceptable. If the transistor operates outside either the fall or rise time limits so that one of the input signals to the AND circuit is never present, the indicator driver maintains the reject indicator in the conducting state to indicate that the transistor is unacceptable. Obviously the scope of this invention includes the use of a single indicator to indicate acceptance or rejection of the transistor.

Timing signal $T_5$ as shown in FIG. 2E on lead wire 36 from delay inverter 10 switches the flip-flops to their reset states so that on repetitive checks the flip-flops are always reset prior to testing for rise and fall times. Obviously, if a recirculation path in the timing chain were not utilized, timing signal $T_5$ could be obtained from a tap on the delay line in the timing chain or another delay inverter or plurality of delay inverters could be added to provide the reset signal from $T_5$ at the proper time.

The incorporation of the recirculation path in the timing chain via lead wire 18 from the delay line back to delay inverter 10 will result in the timing signals repetitively occurring in their same relative time relationships as shown in FIG. 2. In response to these repetitive timing signals, the tests performed upon the transistor, or other electronic device, will be repeated. In this manner another type of worst case condition of operation of the transistor may be performed since the duty cycle of operation of the transistor will be increased. It is well known that the internal temperature of a transistor affects the rise and fall times of the transistor. By repetitively performing the tests previously described there is simulated a higher duty cycle of operation of the transistor thereby subjecting the transistor to a higher internal temperature. For example, assuming the propagation rate of the pulse through the time chain is such that the timing pulses each reoccur one hundred times per second, the transistor will be subjected to test at that same rate which in turn results in a higher internal temperature of the transistor.

Where repetitive tests are performed and a visual indication used to determine whether the transistor is acceptable or not, it is apparent that if only a single failure occurs during a large number of tests the visual indicator would not be able to respond to indicate that single failure. For example assuming the tests were performed at the rate of one hundred per second and that a failure occurred every 20th test, a visual indicator either in the form of a light or oscilloscope presentation would not be able to respond fast enough to indicate the five percent failure rate so that acceptability of the transistor would be indicated. Where the transistor is to operate in a critical circuit so that high reliability is important even a single failure out of a large number repetitive tests should be indicated. This can be done by terminating the repetitive tests at any time that a failure is detected. Although not shown in the figures an embodiment of this invention could include, for the purpose described in the immediately foregoing sentence, a means for terminating the repetitive test on the occurrence and detection of a single failure. This would be incorporated, for example, by including a gate such as an AND circuit in the recirculation path from the delay line back to delay inverter 10. The recirculation gate would be enabled by an output of AND circuit 54 so that in the event a signal did not occur at the output of AND circuit 54 indicating that the transistor failed to meet the requirements of the rise or fall time test the pulse in the timing chain would not be allowed to recirculate so as to repeat the test. This in turn would result in the indicating devices indicating that the transistor is unacceptable.

FIGS. 3 and 3A show in schematic form some of the typical circuitry that is used to perform the functions as described relative to the operation of the block diagram of FIG. 1. Most of the portions of the circuitry of FIGS. 3 and 3A have been blocked off with dotted lines and itemized according to their counterparts in the block diagram of FIG. 1. There are a few exceptions where some of the lead wires have not been included in the FIGS. 3 and 3A in order to maintain clarity. None of the components in the circuits of FIGS. 3 and 3A are valued since obviously these are subject to various design considerations. Additionally, it should be understood that the transistor types, primarily PNP, which are utilized are not limitive and that NPN transistors could be utilized with the appropriate changes in polarities of the potentials. The values of the potentials utilized in the circuitry likewise have not been included since once again these are subject to various design criteria including the type of transistor, components values, etc.

The delay inverters 10, 12, and 14 are identical and comprise a single transistor inverter of the grounded emitter type. With PNP transistors shown a negative going input into the base will cause the transistor to conduct resulting in a positive going output at the collector. As previously stated, these circuits are utilized for delay, amplification, and pulse shaping. A positive going pulse fed into terminal 20 will be inverted first by delay inverter 10 then by delay inverter 12 and result in a positive going signal on lead wire 22 as shown in FIG. 2A. Normally, transistor 66 in the conduction control circuit 24 is maintained in a conducting state so that the collector is approximately at ground potential. The base drive circuit for the transistor under test, which is contained in the test circuit 42 and which includes resistors 68 and 70 along with a diode, is connected to the collector circuit of transistor 66 via lead wire 44. The polarity and magnitude of the potential applied to resistor 68 is such that the base drive circuit normally maintains the test transistor in the cutoff or nonconducting state. The positive going pulse of FIG. 2A applied to the base circuit of transistor 66 causes it to turn off and the negative going pulse from the collector of transistor 66 causes it to turn off and the negative going pulse from the collector of transistor 66 is transmitted to the base drive circuitry of the test transistor causing it to turn on. The operation of the test transistor is monitored in the collector circuit thereof. Lead wire 46 is connected to the collector of the test transistor and with the test transistor in its original nonconducting state a negative potential appears on the lead wire 46. When the test transistor starts to conduct in response to timing signal $T_0$ via the conduction control circuit the potential on the collector changes as the conduction of the test transistor increases and in this manner the conduction level of the transistor is monitored and sensed. The signal on lead wire 46 goes from a negative polarity, when the test transistor is cut-off, toward a more positive polarity as the test transistor conducts. This positive going signal fed into the base of the transistor 72 in rise trigger 28 will cause the PNP transistor to decrease in conduction, depending on the emitter bias on said latter transistor. The inversion through transistor 72 of the positive going signal into a negative going signal on the collector is inverted twice more through transistors 74 and 76 and appears as a negative going signal on lead wire 48 connected to the collector of transistor 76. It is obvious that the bias on the emitter of transistor 72 may be varied and in this manner the amount of the sense signal on lead wire 46 which will produce an appreciable signal output from the rise trigger on lead wire 48 will depend upon the setting of the bias so that the level of conduction of the test transistor will then determine when an output signal will be developed by the rise trigger 28. The negative going signal on lead wire 48 is transmitted to one side of the bistable rise flip-flop 38. In its reset state the right-hand portion of the rise flip-flop is cut off and the left-hand portion is conducting so that a negative potential is on lead wire 52 from the rise flip-flop. The negative input signal into the right-hand side of the flip-flop causes the right-hand side to conduct which in turn results in the left-hand side flipping to the nonconducting state and the potential on lead wire 52 going towards a positive potential. As previously stated, if the only criteria of proper transistor operation is the rise time, the AND circuit 56 which comprises the well known diode AND circuit could be eliminated and the output from the rise trigger on lead wire 52 fed directly to the indicator driver 60. It is apparent that if the AND circuit is in the circuit as shown, both signal inputs to the AND circuit, on lead wires 52 from the rise flip-flop and lead wire 54 from the fall flip-flop, must be present before an output appears on lead wire 58. Assuming either both inputs are present to the AND circuit or that the AND circuit is not included in the circuit, the positive going signal is transmitted via lead wire 58 into the base circuit of transistor 78 in the indicator driver circuit 60. The PNP transistor 78 is normally conducting so the positive signal applied to the base results in cutting off conduction and provides a negative signal on the collector. This negative signal is applied to the base of transistor 80 to turn it on resulting in a positive going signal on the collector. The positive going signal on lead wire 82 causes transistor 84 to turn off thereby opening the current path through the reject indicator 64 and causes transistor 88 to turn on, by being inverted through transistor 86, thereby closing the current path through accept indicator 62.

The foregoing has described how an indication is obtained when the transistor under test is able to respond to a timing signal which initiates conduction of said transistor so that an output signal occurs from the rise trigger sufficient to result in an indication of an acceptable transistor, at least as far as rise time is concerned. Returning now to the circuit of FIG. 3, the delay line 16 in the timing chain comprises a plurality of delay elements, which are not individually shown, with two groups of variable taps connected to these delay elements. Additionally, the delay line includes an emitter follower circuit and a further delay element, the use of which will be described subsequently in more detail. Timing signal $T_1$ shown in FIG. 2B appears at terminal A which is connected to one of the sets of variable taps on the delay line 16. In the block diagram circuit of FIG. 1, the connection between the delay line and the rise trigger is shown via lead wire 26, however, in the circuit of FIG. 1 this lead wire is eliminated for clarity. The terminal A on the delay line 16 should be considered as being connected directly to the terminal A in the rise trigger 28. The negative going timing signal $T_1$ applied to terminal A will result in a negative going signal on the emitter of transistor 90 which is in the emitter follower configuration. This in turn will place the negative signal on the base of transistor 92 causing it to conduct and placing its collector at approximately ground potential. It should be recalled that the positive going sense signal applied to the transistor 72 resulted in a negative going signal on the collector of the latter transistor which resulted in a signal on lead wire 48. However, if timing signal $T_1$ occurs before the output signal is developed on lead wire 48 from the rise trigger it will place the collector of transistor 72 at substantially ground potential thereby preventing the development of an output signal from the rise trigger. In this manner if the transistor under test has failed to reach the predetermined level of conduction in the time interval between timing signal $T_0$, which initiated the conduction, and timing signal $T_1$ no output will result on lead wire 48 and therefore the reject indicator will remain in the conducting state indicating that the transistor has failed to perform to the rise time requirements.

Although the next sequential timing pulse is $T_2$, as shown in FIG. 2C, it is desirable to describe next the operation of the test circuit in checking the fall time of the transistor. The intermediate effect of timing signal $T_2$ will be subsequently described.

Timing signal $T_3$, shown in FIG. 2A, which occurs subsequent to $T_1$, being the trailing edge of the same pulse which produced timing signal $T_0$ is transmitted via lead wire 22 from the output of driver inverter 14 to the conduction control circuit 24. This timing signal $T_3$ being of opposite going polarity than that of $T_0$ will affect the operation of the test transistor in the test circuit 42 in a manner opposite to that described in relation to $T_0$. Timing signal $T_3$ coupled to the conduction control circuit will affect the base drive circuit of the test transistor so that the test transistor is driven from its conducting level back to its cutoff or nonconducting state. This results in a negative going signal on the collector which is coupled via lead wire 46 to the input of the fall trigger 34. This negative going signal applied to the base of transistor 94, which is in the emitter follower configuration, results in a negative going signal applied to the base of transistor 96 causing a positive going signal on the collector of the latter transistor. This in turn results in a positive going signal applied to the base of transistor 98 which in turn develops a negative going signal on the lead wire 50 which is connected to the collector of transistor 98. In this manner when the transistor under test reaches a certain level of conduction, in this instance the cutoff state, a signal is developed by the fall trigger 34 and is transmitted to the fall flip-flop via lead wire 50. In a manner similar to that described in relation to the rise flip-flop being switched by a signal developed by the rise trigger the fall flip-flop is switched from its reset state to its other bistable state in response to the signal on lead wire 50. The potential on lead wire 54 from the fall flip-flop 40 is then utilized to control the operation of the indicators in a manner identical to that described in relation to the rise flip-flop output. With the AND circuit 56 utilized as shown in the figures, both of the flip-flops would have to be in their other stable states in order to provide a signal into the indicator driver 60 to cause the accept indicator 62 to turn on. As previously described in relation to the rise time check if desirable the fall time test could be used exclusively to determine which of the indicators should be energized by eliminating the AND circuit.

Lead wire 32 from the delay line 16 to the fall trigger 34 which provides the disable signal to the fall trigger is not shown in the schematic of FIG. 3, however, it should be assumed that this lead wire connects terminal B in the delay line 16, which is connected to the variable taps on the delay elements, to the terminal B labeled in the circuit. Timing signal $T_4$ shown in FIG. 2D applied to the base of transistor 100 being a positive going signal appears on the emitter of the transistor 100, which is in the emitter follower configuration, and in turn is coupled to the collector of the test transistor via the diode 102. If the sensing signal on the lead wire 46 which is coupled into the fall trigger is insufficient to cause the fall trigger to generate an output signal on lead wire 50 before the occurrence of timing signal $T_4$, the positive going $T_4$ prevents the fall trigger from developing an output signal and, therefore, will result in an indication that the transistor under test has failed to meet the fall time requirements.

In order to describe the effect of timing pulse $T_2$, it is best to first consider the base drive that is applied to the test transistor via the conduction control circuit without $T_2$. In the conduction control circuit transistor 104 is normally conducting so that base drive current applied to the test transistor is from the potential source V in the conduction control circuit through resistor 106 and from there to the base circuit of the test transistor via lead wire 44. The current from potential source V has a parallel path through diode 108 and the normally conducting transistor 104. This parallel path maintains the test transistor base drive current at a certain amount depending on the voltage drops in the circuit. Negative going timing signal $T_2$ from terminal E on delay line 16 is transmitted to the conduction control circuit via lead wire 30 and is applied to the base circuit of transistor 110. The inversion of this negative going signal is applied to the base of transistor 104 turning it off and thereby opening the parallel path of the current flow from the potential source V which results in a greater base drive current applied from said potential source to the base circuit of the test transistor. In this manner the test transistor is driven further into its conduction state or to a higher level of conduction. Since this occurs at a time prior to the fall time test it provides a means for performing the fall time test under a worst case type of operation as previously described, that is by returning the transistor to the cutoff state from a high level of conduction.

Some minor differences between the schematic diagrams of FIGS. 3 and 3A and the block diagram of FIG. 1 are now explained. The timing signal $T_5$, shown in FIG. 2E, as described relative to its use in FIG. 1, resets the rise and fall flip-flops 38 and 40 prior to the initiation of the test of the transistor. In the schematic of FIG. 3A this reset input to the flip-flops is at terminal C and being a negative going signal applied to the base of transistor 112, which is in the emitter follower configuration, would result in a negative going signal applied to the left-hand side of both of the flip-flops causing them to switch to the reset state. In the block diagram of FIG. 1 this reset signal is shown coupled from the output of delay inverter 10 via lead wire 36. In the schematic of FIG. 3 this reset signal is coupled from the delay element which is coupled to the emitter follower output in the delay line 16. The lead wire 36 from terminal C on the delay line to terminal C in FIG. 3A is not shown for the sake of clarity. Since the only requirement is that the flip-flops be reset prior to the initiation of test of the transistor, the fact that in the schematic this reset signal comes from the delay line wheres in the block diagram it comes from the delay inverter, is of no consequence in the operation of the embodiment of this invention since it is purely a matter of choice.

Terminal D on the delay line 16 is connected by a lead wire, not shown, to terminal D which is connected to the base of transistor 114. The purpose of this and the circuitry associated therewith, which is coupled to the test circuit 42, is to insure that during the test for rise time and fall time testing circuitry does not have any adverse effect on the rise time test. This is effected by a signal being coupled to terminal D which back biases diode 102 so that it is an open circuit during the rise time test.

The terminal E shown in the rise trigger circuit 28 of FIG. 3 is connected to the terminal E on delay line 16, although the lead wire is not shown. The purpose of this connection is to couple a signal from the timing chain to the rise trigger so as to disable it during the fall time test. The negative going signal applied to terminal E and coupled to the base of transistor 90 in the rise trigger affects the rise trigger circuitry in a manner identical to that described previously in relation to the timing signal $T_1$ as applied to the rise trigger at terminal A. The purpose is to prevent the rise trigger from possibly developing an output signal during the fall time test. The use of the signals on terminals D and E serve to make the operation of this embodiment of the invention more reliable. It is understood, of course, that further engineering and design requirements for reliable operation will be obvious to those of ordinary skill in the art.

Although the foregoing has described the operation of an embodiment of this invention in which the limits of rise and fall times are predetermined and preset by the selection of the proper variable taps on the timing chain delay line, it is worthwhile to point out another typical use of this embodiment. If it is desired to determine the amount of the rise and/or fall times of a given transistor, by varying the taps on the delay line this can be determined. For example, in an actual use of this invention, the variable taps on the delay line connected to terminal A provide $T_1$ timing signals on adjacent taps which are displaced from one another by five nanoseconds. If a transistor under test is indicated as being unacceptable on the rise time test when terminal A is connected to one of the taps, each of the other available taps can be selectively connected until the indication is that the transistor is acceptable. In this manner the amount of rise time can be determined within five nanoseconds. The same determination can be made for the fall time test.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. Apparatus for determining the relative operational delays in an electronic device, comprising: an electronic timing chain for developing a series of sequential timing signals; means responsive to at least a first timing signal for initiating change in an electronic device from a first operational state to a second operational state at a first time and for initiating change in said electronic device from said second operational state to said first operational state at a second time; a trigger circuit for sensing the operational state of said electronic device and for developing signals indicative of said first and second operational states; and means coupled to said trigger circuit responsive to second and third timing signals for respectively inhibiting said first and second state indicating signals.

2. Apparatus for indicating the relative delays in the operation of an electronic device, comprising: an electronic timing chain for developing at least four timing signals, $T_0$, $T_1$, $T_3$, $T_4$, in corresponding relative time sequence; means responsive to $T_0$ for initiating change in an electronic device from a first state of conduction to a second state of conduction; means responsive to $T_3$ for initiating change in said electronic device from said second state of conduction to said first conduction state; means for sensing the operation of said electronic device and for developing a first output signal when said device reaches said second conduction state in response to $T_0$ and a second output signal when said device reaches said first conduction state in response to $T_3$; means coupled to said sensing means responsive to $T_1$ for preventing development of said first output signal if said first output signal has not yet been developed; and means coupled to said sensing means responsive to $T_4$ for preventing development of said second output signal if said second output signal has not yet been developed.

3. Apparatus for indicating the relative delays in the operation of an electronic device, comprising: means for generating a plurality of sequential timing signals of predetermined time relationships; means responsive to a first timing signal for initiating a first change in the conduction state of said electronic device; means responsive to a second timing signal subsequent to said first timing signal for initiating a second change in the conduction state of said electronic device; means for sensing the conduction state of said electronic device; means responsive to said sensing means for developing a first output signal when said first change in operational state is effected and a second signal when said second change in operational state is effected by the respective initiating signals; means coupled to said signal developing means responsive to a third timing signal, sequentially intermediate said first and second timing signals, for preventing the development of said first output signal if said first output signal has not yet been developed; and means coupled to said signal developing means responsive to a fourth timing signal, subsequent to said second timing signal, for inhibiting the development of said second output signal if said second output signal has not yet been developed.

4. Apparatus as in claim 3 further including: at least two bistable switching means coupled to said sensing means for storing signal indications of said developed first and second signals.

5. Apparatus as in claim 3 further including: a first and a second bistable switching means; means connected between said sensing means and said switching means for switching the state of said first switching means in response to said developed first signal and for switching the state of said second switching means in response to said developed second signal.

6. Apparatus for testing transition time of a semiconductor device having a control element and at least an additional element comprising: a timing chain for developing at least first, second, and third timing pulses, the leading edge of said second pulse occurring timewise intermediate the leading and trailing edges of said first pulse and the leading edge of said third pulse occurring subsequent to the trailing edge of said first pulse, means connected to said timing chain for coupling said first timing pulse to a control element of a semiconductor device for initiating change in said device from a non-conducting state to a predetermined level of conduction in response to the leading edge of said first timing pulse and for initiating change in said device back to said nonconducting state in response to the trailing edge of said first timing pulse; sensing means connected to another element of said semiconductor for developing a first output signal when said device reaches said predetermined level of conduction and a second output signal when said device reaches said non-conducting state in response to the respective edges of said first timing pulse; and means connected between said timing chain and said sensing means responsive to the leading edge of said second timing pulse for preventing development of said first output signal and responsive to the leading edge of said third timing pulse for preventing generation of said second output signal if each of said first and second output signals has not been generated prior to the occurrence of said second and third timing pulses respectively.

7. Apparatus for testing relative delays in the operation of an electronic device, comprising: an electronic timing chain for developing timing signals of predetermined time relationships; means responsive to first and second timing signals for initiating at respective times a first operational state of an electronic device and a second operational state of said electronic device; means responsive to a third timing signal for changing said device to a third operational state at a time intermediate said first and second times; means for sensing said operational states of said device and for developing signals when said device reaches each of said first and second operational states; and means coupled to said sensing means responsive to at least a fourth timing signal for preventing the development of said latter developed signals.

8. Apparatus for testing relative delays in the operation of an electronic device having at least one control element and at least one additional element with said device originally in a non-conducting state, comprising: a multistage pulse distributor, the output pulses of all stages being substantially identical but occurring at relatively different times; conduction control means coupled to a control element of an electronic device responsive to the output pulse from a first stage in said pulse distributor for initiating change in said device from a non-conducting level to a first level of conduction at a time corresponding to the leading edge of said first stage output pulse and for initiating change in said device from a second level of conduction to said non-conducting level at a time corresponding to the trailing edge of said first stage output pulse; means coupled to said conduction control means responsive to an output pulse from a second stage in said pulse distributor, the leading edge of said latter pulse occurring at a time intermediate said leading and trailing edges of said first stage pulse, for increasing the conduction of said device to said second level at a time corresponding to the leading edge of said second stage pulse; sensing means coupled to another element of said device for developing signals corresponding to said conduction levels of said device; trigger circuit means responsive to said sensing means signals for generating a first output signal when said device reaches said first level of conduction and a second output signal when said device reaches said non-conducting level in response to said first stage pulse; output signal disabling means responsive to the output pulse from a third stage in said pulse distributor, the leading edge of said third stage pulse occurring at a time intermediate said leading edge of said first stage pulse and said leading edge of said second stage pulse, coupled to said trigger circuit means for preventing the generation of said first output signal at a time corresponding to the leading edge of said third stage output pulse; and means responsive to the output pulse from a fourth stage in said pulse distributor, the leading edge of said fourth stage pulse occurring at a time subsequent to said trailing edge of said first stage pulse, coupled to said trigger circuit means for preventing the generation of said second output signal at a time corresponding to the leading edge of said fourth stage output pulse.

9. Apparatus for testing and indicating delays in the operation of an electronic device, comprising: an electronic timing chain for developing at least five timing signals, $T_0$–$T_4$ in corresponding relative time sequence; means responsive to $T_0$ for initiating change in an electronic device from a first state of conduction to a second level of conduction and responsive to $T_2$ for changing said electronic device from said second level of conduction to a third level of conduction and responsive to $T_3$ for initiating change in said electronic device from said third level of conduction back to said first conduction state; means for sensing the operation of said electronic device and for developing a first output signal when said device reaches said second conduction level in response to $T_0$ and a second output signal when said device reaches said first conduction state in response to $T_3$; means coupled to said sensing means responsive to $T_1$ for preventing development of said first output signal if said first output signal has not yet been developed, and responsive to $T_4$ for preventing development of said second output signal if said second output signal has not yet been developed; a pair of bistable flip-flops, each having a reset state and another state, coupled to receive said output signals whereby said first output signal switches one of said flip-flops from its reset state to its other state and the second output signal switches the other flip-flop from its reset state to its other state; and means coupled to both of said flip-flops for indicating when both of said flip-flops are concurrently in said other states.

10. Apparatus for testing and indicating delays in the operation of an electronic device, comprising: a timing chain for developing at least six timing signals, $T_0$–$T_5$, in corresponding relative time sequence, said timing chain including a gated recirculation path whereby said timing signals repetitively occur in said timing chain in their same time relationships; means responsive to $T_0$ for initiating change in an electronic device from a first level of conduction to a second level of conduction and responsive to $T_2$ for changing said electronic device from said second level of conduction to a third level of conduction and responsive to $T_3$ for initiating change in said electronic device from said third level of conduction back to said first conduction state; trigger circuit means for sensing the operation of said electronic device and for developing a first output signal when said device reaches said second conduction level in response to $T_0$ and a second output signal when said device reaches said first conduction state in response to $T_3$; means coupled to said trigger circuit means responsive to $T_1$ for preventing development of said first output signal if said first output signal has not been developed by the time of occurence of $T_1$ and responsive to $T_4$ for preventing development of said second output signal if said second output signal has not been developed by the time of occurrence of $T_4$; a pair of bistable flip-flops having a reset state and another state coupled to receive said output signals from said trigger circuit means whereby one of said flip-flops switches from its reset state to its other state in response to said first output signal and the other flip-flop switches from its reset state to its other state in response to said second output signal; means coupled to both of said flip-flops for detecting coincidence of said flip-flops in their other states and for enabling said gating means in said timing chain recirculation path upon detection of said coincidence; and means responsive to $T_5$ for resetting said flip-flops.

11. Apparatus for testing and indicating delays in operation of a semiconductor device having a control element and at least one additional element, comprising: a timing chain for developing at least six timing signals, $T_0$–$T_5$, in corresponding relative time sequence, said timing chain including a gated recirculation path whereby said timing signals repetitively occur in their same timing relationship; first circuit means coupled to the control element of a semiconductor device responsive to $T_0$ for initiating a change in said semiconductor device from a non-conducting state to a first level of conduction and responsive to $T_2$ for increasing the level of conduction of said semiconductor device and responsive to $T_3$ for initiating change in said semiconductor device from said increased level of conduction back to said non-conducting state; means coupled to another element of said semiconductor device for sensing the conduction levels of said device; first trigger circuit coupled to said sensing means for developing a first output signal when said device reaches said first level of conduction in response to $T_0$; second trigger circuit coupled to said sensing means for developing an output signal when said semiconductor device reaches said nonconducting state in response to $T_3$; means coupled to said first trigger circuit responsive to $T_1$ for preventing the development of said first trigger circuit output signal if said output signal has not been developed by the time of occurrence of $T_1$; means coupled to said second trigger circuit responsive to $T_4$ for preventing the development of said second trigger output signal if said output signal has not been developed by the time of occurrence of $T_4$; a pair of bistable flip-flops each having a reset state and another state; means for switching one of said flip-flops from its reset state in response to said first trigger circuit output signal; means for switching the other flip-flop from its reset state in response to said second trigger circuit output signal; coincidence circuit means coupled to both of said flip-flops for indicating when both are in their other stable states and for enabling said timing chain recirculation path gating means; and means responsive to $T_5$ for switching both of said flip-flops to their reset states.

12. Apparatus for testing and indicating the rise and fall times in the operation of a transistor having a control element and at least one additional element, comprising: a timing chain for developing at least six timing signals, $T_0$–$T_5$, in corresponding relative time sequence including a gated recirculation path whereby said timing signals repetitively occur in their same relative time relationships as long as said recirculation path is enabled; a conduction control circuit coupled to the control element of a transistor responsive to $T_0$ for initiating turn-on of said transistor from the cutoff state to a first level of conduction, and responsive to $T_2$ for increasing the conduction to a higher level and responsive to $T_3$ for initiating a change from said higher level of conduction back to said cutoff state, the time required for said transistor to reach said first level of conduction in response to $T_0$ being indicative of the transistor rise time and the time required for the transistor to return to cutoff in response to $T_3$ being indicative of the fall time; first trigger circuit coupled to another element of said transistor for developing an output signal when said transistor reaches said first level of conduction in response to $T_0$; means coupled to said first trigger circuit responsive to $T_1$ for preventing the development of said first output signal if it has not been developed by the time of occurrence of $T_1$, a first trigger circuit output signal thereby indicating that the rise time of said transistor is less than the time interval between $T_0$ and $T_1$; a second trigger circuit coupled to said other transistor element for developing an output signal when said transistor reaches the cutoff state in response to $T_3$; means coupled to said second trigger circuit responsive to $T_4$ for preventing the development of said second trigger circuit output signal if said signal has not been developed by the time of occurrence of $T_4$, the occurrence of a second trigger circuit output signal indicating that the transistor fall time is less than the time interval between $T_3$ and $T_4$; a pair of bistable flip-flops each having a reset state and another state; means for switching one of said pair of flip-flops from its reset state in response to said first trigger circuit output signal; means for switching the other of said pair of flip-flops from its reset state in response to said second trigger circuit output signal; a coincidence circuit coupled to both of said flip-flops for indicating when both are not in their reset states thereby indicating that both the rise and fall times of the transistor are within their respective time limits; means responsive to said coincidence indication for enabling said timing chain recirculation path whereby said timing signals repetitively occur as long as both the rise and fall times of the transistor are within their time limits; and means responsive to $T_5$ for resetting both of said pair of flip-flops.

13. Apparatus for testing the relative operational delays in an electronic device, comprising: an electronic timing chain for developing timing signals of predetermined time relationships with respect to one another; means responsive to said timing signals for initiating a first operational current conductive state of an electronic device at a first time and for initiating a second operational current nonconducting state of said electronic device at a second time subsequent to the first time; means for sensing said operational states and for developing output signals when said device reaches each of said operational states; means coupled to said sensing means responsive to at least another timing signal for inhibiting the development of at least one of said output signals if the respective operational state has not been reached at the time of occurrence of said another timing signal; and means responsive to a third timing signal for increasing the level of conduction of said device at a time intermediate said first and second times.

14. Apparatus as in claim 13 further including means coupled to said inhibiting means for disabling said recirculation path when the development of said output signal indication has been prevented.

15. Apparatus as in claim 1 further including: a gated recirculation path in said timing chain which when enabled causes said timing signals to repetitively occur in their same sequential order; and means for disabling said recirculation path upon the inhibiting of said first and second state indicating signals.

16. Apparatus as in claim 6 further including: a gated recirculation path in said timing chain which when enabled causes said timing pulses to repetitively occur in their same time relationships; and means for disabling said recirculation path when the development of said first or second output signals has been prevented.

17. Apparatus as in claim 7 further including: a gated recirculation path in said timing chain which when enabled causes said timing signals to repetitively occur in their same predetermined time relationships; and means for disabling said recirculation path when development of the latter developed signals has been prevented.

References Cited by the Examiner

UNITED STATES PATENTS

| | | | |
|---|---|---|---|
| 2,444,341 | 6/1948 | Easton | 324—68 |
| 2,601,492 | 6/1952 | Baker | 324—68 |
| 2,688,051 | 8/1954 | Liguori et al. | 324—68 X |
| 2,939,075 | 5/1960 | Schwab | 324—68 X |
| 3,007,113 | 10/1961 | Kreinberg | 324—158 |
| 3,041,537 | 6/1962 | Cagle et al. | 324—158 |
| 3,074,017 | 1/1963 | Sunstein et al. | 324—57 X |

OTHER REFERENCES

"Automatic Rise Time Measurement," IBM Technical Disclosure Bulletin, vol. 2, No. 6, April 1960, page 47.

"Automatic Time Sensing of Pulse Amplitude," IBM Technical Disclosure Bulletin, vol. 2, No. 6, April 1960, page 52.

WALTER L. CARLSON, *Primary Examiner.*

FREDERICK M. STRADER, *Examiner.*